United States Patent [19]

Bretl

[11] Patent Number: 4,907,069

[45] Date of Patent: Mar. 6, 1990

[54] TWO-CHANNEL COMPATIBLE HDTV SYSTEM

[75] Inventor: Wayne E. Bretl, Schaumburg, Ill.

[73] Assignee: Zenith Electronics Corporation, Glenview, Ill.

[21] Appl. No.: 201,137

[22] Filed: Jun. 1, 1988

[51] Int. Cl.[4] .................... H04N 11/00; H04N 11/02; H04N 7/00

[52] U.S. Cl. ...................................... 358/12; 358/141

[58] Field of Search ........................... 358/12, 13, 141

[56] References Cited

U.S. PATENT DOCUMENTS

| | | | |
|---|---|---|---|
| 3,617,626 | 11/1971 | Bluth | 358/12 |
| 4,628,344 | 12/1986 | Glenn | 358/12 |
| 4,694,338 | 9/1987 | Tsinberg | 358/12 |
| 4,723,157 | 2/1988 | Wendland et al. | 358/142 |

OTHER PUBLICATIONS

"High-Definition Television Update", by Ronald K. Jurgen, Senior Editor, IEEE Spectrum, Apr. 1988, pp. 56–62.

Primary Examiner—John W. Shepperd

[57] ABSTRACT

A video signal is produced as a 37.8 MHz bandwidth high resolution signal. The system then derives a compatible NTSC signal from that signal and transmits the NTSC signal on one channel and an enhancement signal is transmitted on a second channel. The enhancement signal is produced by storing the 37.8 MHz signal, scanning it at a lower frame rate, and folding it so that the original information is retained within a normal channel width. In an HDTV receiver, the two channels are received and the signals are decoded separately then, using dot interlace techniques, combined to produce the HDTV signal having three times the horizontal and vertical resolution of a standard NTSC signal.

30 Claims, 4 Drawing Sheets

TWO-CHANNEL COMPATIBLE HDTV SYSTEM

BACKGROUND OF THE INVENTION

This invention relates to the field of high definition television (HDTV) and, more particularly, to an HDTV system which is also compatible with existing television receivers.

In the field of television, whether broadcast, satellite or cable systems, there is much interest in improving picture definition over that provided by the NTSC standards first established in the U.S. in 1953 (NTSC=National Television System Committee). At the present time, over a dozen HDTV systems have been proposed, most of which have not been field-tested. For an overview of many of these systems, see IEEE SPECTRUM, Vol. 25, No. 4, Apr. 1988, pp 56–62.

Some of the proposed systems require only a single channel (6MHz), others one and one-half channels or more. Some of the proposed systems are compatible and use only one channel, others are compatible but use more than one channel, others are incompatible. Many of the systems are designed for the 16:9 aspect ratio often used for motion picture displays, but will not accommodate the full 4:3 frame used in most motion picture production.

An approach which could accommodate the motion picture industry by providing a high quality of reproduction, allowing for various framing options while matching the standard aspect ratio of the present motion picture and television systems, and including compatibility, would be preferable to any of the presently proposed systems.

SUMMARY OF THE INVENTION

It is an object of the present invention to provide television service which has superior definition when the complete transmitted signal is utilized.

It is a particular object to provide the superior definition while also providing compatibility with existing television receivers.

These objects and others which will become apparent are provided in the system of the present invention wherein a signal is created which has three times the number of horizontal scanning lines of the NTSC system and three times the horizontal resolution of NTSC. The improved system will be termed 3XNTSC herein for simplicity. The 3XNTSC signal as derived is a 37.8 MHz signal of 1575 lines/frame, 30 frames/60 fields with 2:1 interlace, and provides a useful resolution of approximately 1014 lines per picture height (1/ph) with an aspect ratio of 4:3 (assuming a Kell factor of 0.7). A standard NTSC signal is derived from the 3XNTSC signal and sent on one 6 MHZ channel. On a second 6 MHz channel an enhancement signal is transmitted which includes the 1575 lines sampled at 6.0 or 7.5 frames/sec. The two signals are combined at an 3XNTSC receiver, and with resampling techniques, the original resolution is restored.

DETAILED DESCRIPTION OF THE INVENTION

Figure 1A:
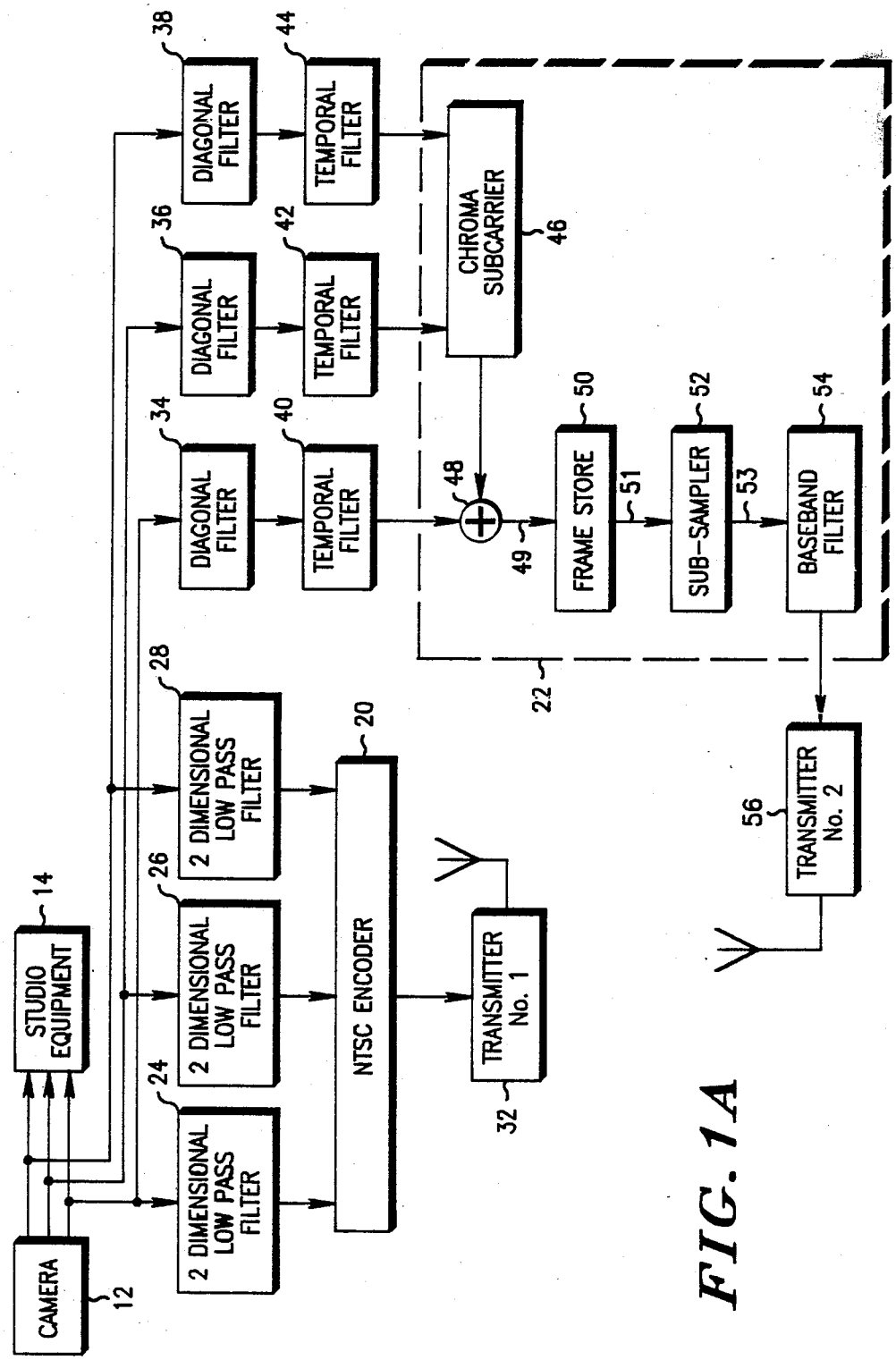
FIG. 1A is a block diagram of a preferred embodiment of the transmitter of the invention.
Figure 1B:
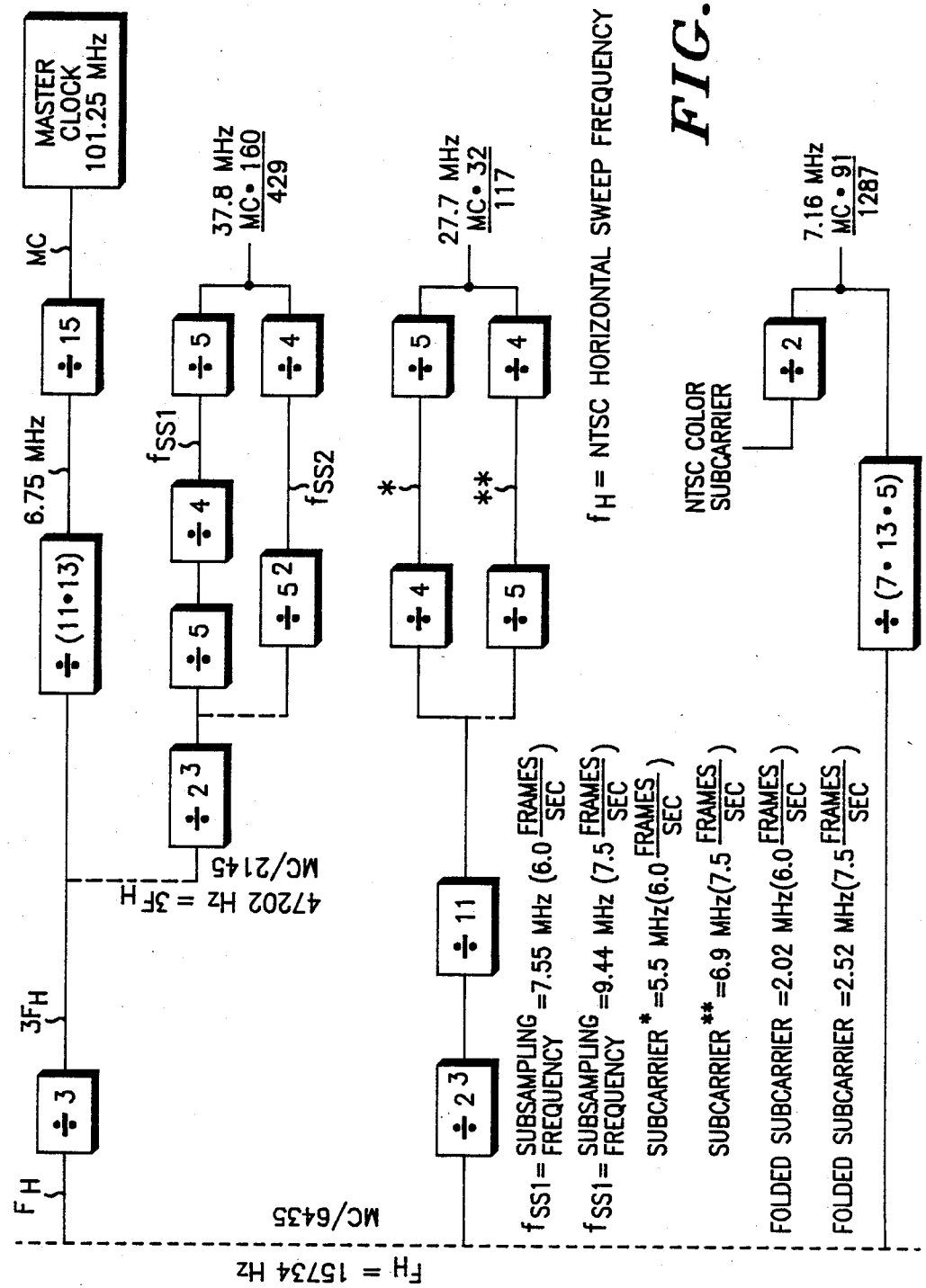
FIG. 1B is a chart of the frequency relationships for the transmitter of FIG. 1A.
Figure 2A:
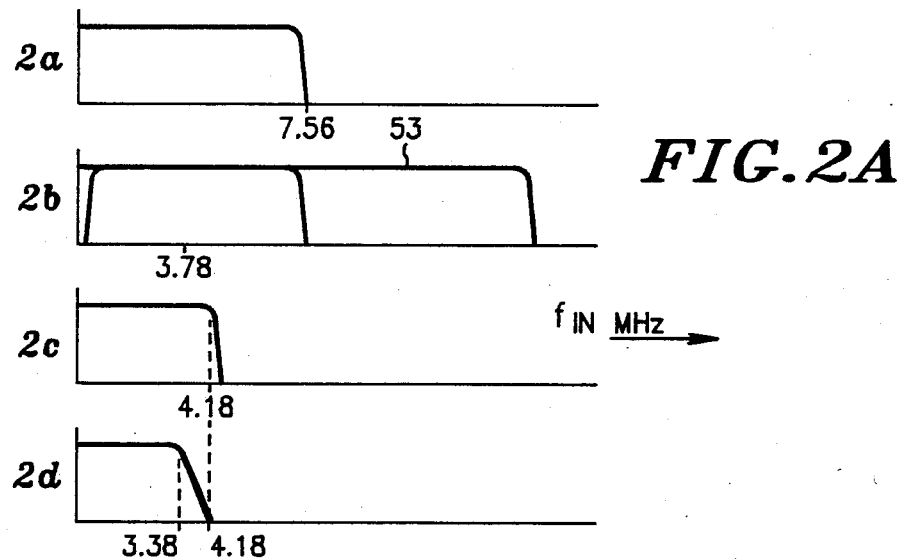
FIG. 2A is a spectrum chart related to FIG. 1A.
Figure 2B:
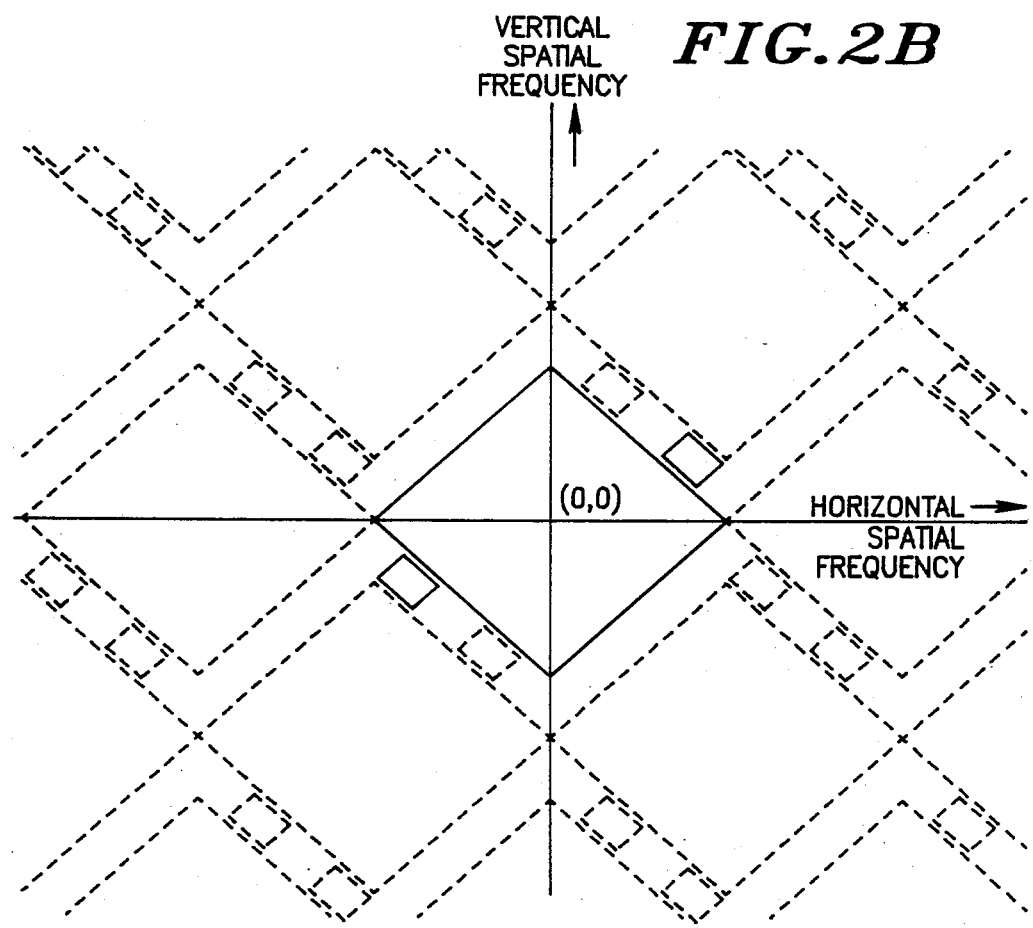
FIG. 2B is a 2-dimensional spatial frequency spectrum chart also related to FIG. 1A.

FIG. 1A shows a transmission system which could produce the HDTV signal here termed 3XNTSC, FIG. 1B shows the frequency relationships in the transmitter, FIG. 2A shows related spectra and FIG. 2B is a 2-dimensional frequency chart.

In a station, a camera 12 will provide an output signal having 1575 lines/frame with 30 frames/sec, 60 fields, interlaced 2:1 with a baseband width of 37.8 MHz. This output signal can be the usual Y, $C_1$, $C_2$ combination or red, green, blue (RGB) signals, and would be coupled to the usual studio equipment 14 such as monitors, recorders, etc., and to two encoders, an NTSC encoder 20, and a 3XNTSC encoder 22.

The Y, $C_1$, $C_2$ signals are coupled to the NTSC encoder 20 through a trio of two-dimensional lowpass filters 24,26,28, respectively. The lowpass filters convert the 3XNTSC signal to NTSC format by means of at least a line store, and possibly field or frame store. If the NTSC encoder does not include an I,Q matrix, a matrix could be inserted at the point referenced 30. The encoder 20 will feed the encoded signal to a first channel transmitter 32 which then transmits a normal NTSC 6 MHz signal.

The Y, $C_1$, $C_2$ signals are also coupled to the 3XNTSC encoder 22 through a second trio of diagonal filters 34,36,38 and a third trio of temporal filters 40,42,44, respectively. The output signals of the filters 42, 44 are coupled to a chroma subcarrier coder 46. The output signals of the coder 46 and the temporal filter 40 are combined in an adder 48 and the adder output 49 is stored in a frame store 50. The signals in the frame store thus contain the full 37.8 MHz composite signal 51, which is sampled by a subsampler 52 with output signal 53.

The filters 34,36,38,40,42,44 preferably use field and/or frame stores to remove high diagonal spatial frequencies which would interfere with chroma subcarrier coder 46 or subsampler 52. The stored frame is read out at a rate of six frames/sec, compressing the signal 49 into a 7.56 MHz signal 51 as seen in 2a. The six frame/sec signal is sub-sampled in the sub-sampler 52 at a rate of 7.56M samples/sec, which effectively modulates the composite signal onto a suppressed 7.56 MHz carrier to provide the "folded" signal 53 of the signal 2b. The signal 2b includes all of the information of the original (2a) and the folded signals, including the chroma information. The signal 2b is filtered in a baseband filter 54 to form signal 2c, which preferably cuts off at about 4.19 MHz, and is coupled to a second channel transmitter 56. The transmitted signal therefore includes all of the information of the composite signal, refreshed at a six frame/sec rate. Thus, the enhancement portion of the 3XNTSC signal is the 1575 lines/frame signal which has been subsampled at one-fifth the frame rate of an NTSC signal or 6 frames/sec. The signal transmitted by the transmitter 32 is a normal 6 MHz NTSC signal and requires no further description.

The signal transmitted by the transmitter 56 is another 6 MHZ signal and may include an audio channel if desired, but this is not necessary to the invention. The second channel signal will preferably also contain sync signals to facilitate synchronizing the signals of the two channels, control of the chroma decoder and control of resampling at the receiver, and may contain audio signals as well.

The two-dimensional (horizontal and vertical) lowpass filters 24,26,28, reduce the high frequency content of the camera output which could produce aliasing in the NTSC signal. The filters should include at least a two line period delay or storage capability in order to average three successive 3XNTSC lines into one NTSC line and these spatial filters should preferably include temporal filtering (three dimensional filtering). The function of the diagonal filters 34,36,38 is to limit the spectra of the signals to "diamond-shaped" baseband signals which provide two-dimensional spectrum space for the luminance and chroma information and allow the proper subsampling. The temporal filters 40,42,44 could have any one or a combination of several characteristics, depending on the design parameters required; e.g., single frame grab and repeat or frame freeze, multiple frame averaging, linear or non-linear temporal filtering characteristic, and continuous update from the input. The chroma subcarrier coder 46 could alternatively follow the frame store and subsampler where the chroma information would be modulated onto the correct folded subcarrier frequency.

The output of the adder 48 is a 3XNTSC composite signal; i.e., a 1575 line, 30 frame signal which occupies a bandwidth of 37.8 MHz. In order to reduce the required bandwidth so that the signal can be transmitted in a 6 MHz channel, the signal is stored in a frame store which is refreshed at a rate of 30 frames/sec. The signal is read out at a lower scan speed, the resulting output signal having 6 frames/sec but still containing the full 1575 line information. This output signal, however, requires a 7.56 MHz bandwidth and must be folded down by subsampling with a 7.56 MHz (approx.) carrier and filtering in order to fit within a 6 MHz channel.

The subsampling frequency and phase relationship from field to field are chosen to give a diagonal sampling pattern in a complete frame of two fields. The chroma subcarrier frequency is chosen to produce a diagonal stripe pattern whose electrical frequency can be folded by the subsampling process of the subsampler 52 to fall within the passband of the baseband filter 54, but which will be restored to its proper higher frequency when two subsampled fields are combined into one frame at the receiver.

In the frequency relationship chart of FIG. 1B, a master clock frequency MC of exactly 101.25 MHz can be seen to provide all of the desired frequencies of the 3XNTSC system. Since many of the frequencies are stated approximately, exact ratios are also given. Thus, $MC \div 15 = 6.75$ MHz, and 6.75 MHz$\div 143$ (or $11 \times 13) \approx 47202$ Hz, the horizontal scanning frequency $3F_H$ for 3XNTSC. Another division by three provides the horizontal scanning frequency $F_H$ for NTSC, $\approx 15734$ Hz.

$3F_H \times 800$ (or $2^5 \times 5^2) \approx 37.8$ MHz, the subsampling frequency at 30 frames/sec which, divided by five, is $\approx 7.5$ MHz, the subsampling frequency at 6 frames/sec (or, divided by four, is $\approx 9.44$ MHz, the subsampling frequency at 7.5 frames/sec). $F_H \times 352$ (or $8 \times 11 \times 4) \approx 5.54$ MHz, the color subcarrier for 3XNTSC at 6 frames/sec, and $5 \times 5.54 \approx 27.7$ MHz, the color subcarrier for 3XNTSC at 30 frames/sec. [$F_H \times 440$ (or $2^5 \times 11 \times 5) \approx 6.92$ MHz, the color subcarrier at 7.56 frames/sec.]The folded subcarrier frequencies are approximately $7.56 - 5.54 = 2.02$ MHz and $9.44 - 6.92 = 2.52$ MHz for 6 and 7.5 frames/sec, respectively.

In order to provide diagonal offset subsampling, the phase of the subsampling frequency is alternated between 0° and 180° on successive fields. The phase of the color subcarrier is also alternated on successive fields in order to produce a signal which is not an alias of any luminance frequency in the 2-dimensional diamond-shaped luminance baseband.

The same conditions may also be obtained by offsetting the stated subsampling and color frequencies by ±0.5 the vertical sweep frequency (an offset of approx. ±30 Hz). Such choices, however, result in more complex ratio relationships between the 3XNTSC and NTSC frequencies. In the figure, the x-axis represents horizontal spatial frequencies, the vertical axis, vertical spatial frequencies and the large solid-line diamond-shaped area surrounding the (0,0) point represents the luminance area. The small solid diamonds are the chroma sidebands, and the dashed line areas are the aliases due to diagonal subsampling. (Note: the diamond shapes are approximately square.)

Figure 3:
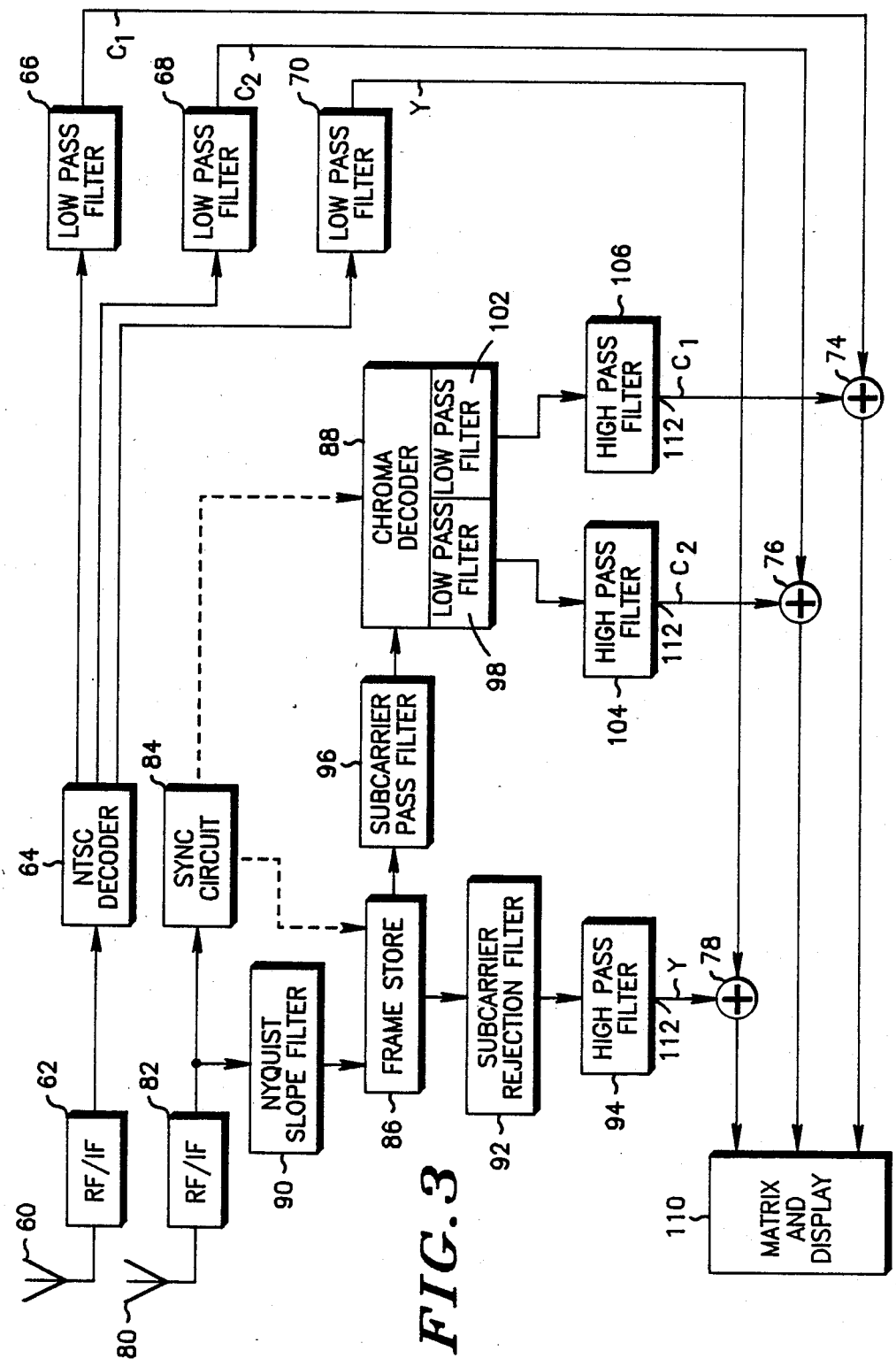
FIG. 3 is a block diagram of a preferred embodiment of a receiver for use with the transmitter of FIG. 1A.

In FIG. 3 is shown a receiver block diagram having two parts for receiving the two transmitted channels which combine to produce a high definition 3XNTSC television picture. The first channel signal (NTSC) from the transmitter 32 of FIG. 1A is received at an antenna 60 and coupled through a standard NTSC RF/IF stage 62 and NTSC decoder 64 to provide the $C_1,C_2,Y$ signals as in the transmitter. These three signals are filtered separately in a trio of lowpass filters 66,68,70 and coupled to adder circuits 74,76,78, respectively.

At an antenna 80, which could be the same as the antenna 60, the second channel signal is received and coupled to another RF/IF section 82. The output of the section 82 is coupled to several blocks; one being a sync circuit 84 which will extract the sync signals for controlling the writing to a frame store 86 (which effects re-sampling) and also a chroma decoder 88. The RF/IF section 82 output signal is coupled to the frame store 86 through a Nyquist slope filter 90 whose output signal is shown in 2d with a cutoff of approximately 4.18 MHz; i.e., the upper edge of the filter response is anti-symmetrical about the folding frequency (one-half the subsampling frequency). The frame store 86 output is coupled to a two-dimensional subcarrier frequency reject filter 92 which outputs through a highpass filter 94, providing signal Y to the adder 78. The frame store 86 is also coupled to the chroma decoder 88 through a two-dimensional subcarrier frequency bandpass filter 96. The decoder 88 includes a pair of two-dimensional lowpass filters 98,102 which limit the output bandwidth to that which can be utilized without luminance/chroma interference. The filter outputs are coupled through a pair of highpass filters 104,106, providing $C_2$ and $C_1$ to the adders 76,74, respectively. Thus, the outputs $Y,C_1,C_2$ of the highpass filters 94,104,106 are combined with the $Y,C_1,C_2$ of the NTSC signal. The combined signals are then coupled to a matrix/display 110 for providing a high definition video display. The lowpass filters 66,68,70 should, of course, be complementary to the highpass filters 94,104,106.

It is to be noted that, instead of positioning the frame store 86 as shown in FIG. 3, multiple frame stores could be positioned at the points referenced as 112, the inputs of the adders 74,76,78. In this alternative arrangement, the subcarrier pass filter 96, the subcarrier reject filter 92 and the chroma decoder 88 would operate at a lower rate, but might be required to contain field stores to accomplish the desired two-dimensional filtering. Corresponding adjustments would be made in other associated components.

Thus, there has been shown and described a system for transmitting high definition television pictures which have three times the resolution of the present NTSC system in both the horizontal and vertical dimensions, and which are compatible with present NTSC receivers. The signals are sent on two 6 MHz channels, one carrying a normal NTSC signal and one carrying the enhancement data. The signal as derived occupies a 37.8 MHz bandwidth. The wideband signal is stored and scanned at a frame rate one-fifth the normal rate, occupying a 7.56 MHz band. The scanned signal is folded over so that it occupies only 3.56 MHz for transmission. The full signal can then be restored at the receiver, and using dot interlace and phase reversal techniques, when combined with the signal on the NTSC channel a very high resolution picture is produced. With such high resolution, a smaller portion of the full 4:3 frame, having almost any desired aspect ratio. can be displayed satisfactorily. It is to be noted that, while the present invention has been shown and described with respect to only the NTSC system, the invention is equally applicable to other known and pre-existing color television systems. It will be apparent to those skilled in the art that other variations and modifications of this invention are possible and it is desired to cover all such as fall within the scope of the appended claims.

What is claimed is:

1. A system for transmitting visual and audio signals and comprising:
    means for producing a set of visual signals representing a scene to be reproduced by a video receiver and having an aspect ratio compatible with a pre-existing color television broadcast system;
    means for producing audio signals representing information in the audio frequency range;
    first processing means for processing said set of visual signals and said audio signals to produce a first channel signal which is essentially compatible with a pre-existing color television system and includes synchronizing signals and a first set of horizontal lines; and
    second processing means for processing said set of visual signals to produce a second channel signal which includes and extends the spatial frequency response of said first channel signal and includes a second set of horizontal lines having three times as many lines as the first channel signal, said second set of horizontal lines being transmitted at a scanning rate which is substantially lower than the scanning rate of the pre-existing system, and said second processing means includes means for producing three output signals in response to the chroma and luminance of said scene and means for removing high diagonal spatial frequencies from each of said three output signals.

2. The system according to claim 1 wherein said preexisting system is the system proposed by the U.S. National Television System Committee (NTSC).

3. The system according to claim 1 wherein the second channel signal further includes synchronizing signals related to the synchronizing signals of said pre-existing system.

4. The system according to claim 1 wherein said second processing means includes means for adding audio signals to said second channel signal.

5. The system according to claim 1 wherein said second channel signal occupies a standard 6 MHZ radio frequency channel.

6. The system according to claim 1 wherein said removing means includes filter means for providing a frame freeze characteristic.

7. The system according to claim 1 wherein said removing means includes filter means for providing a multiple frame averaging characteristic.

8. The system according to claim 1 wherein said removing means includes filter means for providing a linear temporal filter characteristic.

9. The system according to claim 1 wherein said removing means includes filter means for providing a non-linear temporal filter characteristic.

10. The system according to claim 1 wherein said lower scanning rate is six frames per second.

11. The system according to claim 1 wherein said lower scanning rate is seven and one-half frames per second.

12. The system according to claim 1 wherein said second processing means includes subsampling means for reducing the scanned signal bandwidth by one-half.

13. A system for transmitting high definition television signals and comprising:
    camera means for producing wide bandwidth video signals having an aspect ratio compatible with a pre-existing color television broadcast system and having very high resolution at the normal frame rate of said pre-existing system;
    first encoder means for producing from said video signals a first modulator signal which is essentially the standard signal of said pre-existing system;
    first transmitter means for transmitting said first modulator signal on a first channel;
    means for producing from said video signals a high resolution signal which has a bandwidth several times wider than the bandwidth of said pre-existing system;
    frame storage means for storing said high resolution signal;
    means for retrieving said stored signal at a rate substantially lower than the scanning rate of said camera means and subsampling said retrieved signal to provide a folded second modulator signal occupying a bandwidth no wider than the bandwidth of said pre-existing system; and
    second transmitter means for transmitting said second modulator signal.

14. The system according to claim 13 wherein said preexisting system is the system proposed by the U.S. National Television System Committee (NTSC).

15. The system according to claim 13 and wherein said producing means include filter means for removing high diagonal spatial frequencies from said second modulator signal.

16. The system according to claim 13 and wherein said producing means includes means for including synchronizing signals in said transmitted second modulator signal.

17. The system according to claim 15 and including means for modulating chroma signals on a subcarrier which lies outside the 2-dimensional baseband region of the luminance signals.

18. A receiver for utilizing television signals occupying first and second channels and having three times the resolution of a pre-existing color television system in two dimensions, the signal in the second channel being derived by scanning at three times the rate of said pre-existing system and being subsampled to reduce the bandwidth of the scanned signal, the reduced bandwidth signal containing all information of the scanned signal, the receiver comprising:
   first means for receiving and decoding said first channel television signal to provide the normal signal of said pre-existing system at the standard frame rate of that system;
   second means for receiving and decoding said second channel television signal to provide a resolution enhancement signal at a reduced frame rate;
   combining means for combining said normal signal and said enhancement signal to provide a high definition television signal; and
   display means for utilizing said television signals to create a video display.

19. The receiver according to claim 18 wherein said preexisting system is the system proposed by the U.S. National Television System Committee (NTSC).

20. The receiver according to claim 18 wherein said first receiving means includes lowpass filter means for filtering said normal signal and said second receiving means includes high pass filter means for filtering said high definition television.

21. The receiver according to claim 18 and further including frame storage means.

22. The receiver according to claim 18 and wherein the received television signals include three signals related to chroma and luminance.

23. The receiver according to claim 22 and wherein said display means includes means for matrixing said three chroma-and luminance-related signals.

24. The receiver according to claim 18 and wherein said second receiving and decoding means includes two-dimensional chroma filtering means.

25. The receiver according to claim 18 and wherein said second receiving and decoding means includes two-dimensional luminance filtering means.

26. The receiver according to claim 18 and wherein said first receiving and decoding means includes lowpass filter means, said second receiving and decoding means includes highpass filtering means and said filtering means are complementary.

27. The receiver according to claim 18 and wherein said second receiving and decoding means includes a Nyquist slope filter.

28. A high definition television system comprising;
   transmission means including;
      means for producing a set of signals representing a scene to be reproduced by a video receiver;
      means for producing audio signals representing information in the audio frequency range;
      first processing means for processing said set of visual signals and said audio signals to produce a first channel signal which is essentially compatible with a pre-existing color television system and includes a first set of horizontal lines;
      first transmitting means for transmitting said first channel signal;
   second processing means for processing said set of visual signals to produce a second channel signal complementary to said first channel signal and including a second set of horizontal lines having three times as many lines as the first channel signal, said second set of horizontal lines being produced at a scanning rate which is substantially lower than the scanning rate of said pre-existing system signal, said second processing means including means for producing three output signals in response to the chroma and luminance of said scene, and means for removing high diagonal spatial frequencies from each of said output signals;
   second transmitting means for transmitting said second channel signal; and receiving means including;
      first means for receiving and decoding said first channel television signals to provide the normal signal of said pre-existing system and having the standard frame rate thereof;
      second means for receiving and decoding said second channel television signals to provide resolution enhancement signals at a reduced frame rate;
      combining means for combining said normal signal and said resolution enhancement signals to provide high definition television signals; and
      display means for utilizing said television signals to create a video display.

29. The system according to claim 28 wherein said preexisting system is the system proposed by the U.S. National Television System Committee (NTSC).

30. The television system according to claim 28 wherein said set of visual signals includes signals representing the chroma of said scene, said first and second receiving and decoding means include chroma decoding means, and said display means displays the colors of said scene in response to said chroma representing signals.

* * * * *